(12) United States Patent
Kataoka

(10) Patent No.: US 9,657,900 B2
(45) Date of Patent: May 23, 2017

(54) PRESSURE VESSEL

(71) Applicant: Kobe Steel, Ltd., Hyogo (JP)

(72) Inventor: Yasuto Kataoka, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 236 days.

(21) Appl. No.: 14/397,941

(22) PCT Filed: Jun. 13, 2013

(86) PCT No.: PCT/JP2013/003723
§ 371 (c)(1),
(2) Date: Oct. 30, 2014

(87) PCT Pub. No.: WO2013/190808
PCT Pub. Date: Dec. 27, 2013

(65) Prior Publication Data
US 2015/0090727 A1    Apr. 2, 2015

(30) Foreign Application Priority Data

Jun. 20, 2012 (JP) ................................. 2012-138774

(51) Int. Cl.
*F17C 1/02* (2006.01)
*F16J 12/00* (2006.01)
*F17C 1/00* (2006.01)

(52) U.S. Cl.
CPC ................ *F17C 1/02* (2013.01); *F16J 12/00* (2013.01); *F17C 1/00* (2013.01);
(Continued)

(58) Field of Classification Search
CPC ...... F17C 1/08; F17C 1/02; F17C 2201/0157; F17C 2201/058; F17C 2201/056;
(Continued)

(56) References Cited

U.S. PATENT DOCUMENTS 2,095,256 A    10/1937 Horton
5,651,474 A *   7/1997 Callaghan et al. ........... 220/565
(Continued)

FOREIGN PATENT DOCUMENTS

JP    H01-161428 U    11/1989
JP    H06-508589 A     9/1994
(Continued)

OTHER PUBLICATIONS

English translation for JP 2010-243015.*
(Continued)

*Primary Examiner* — Fenn Mathew
*Assistant Examiner* — Madison L Poos
(74) *Attorney, Agent, or Firm* — Studebaker & Brackett PC

(57) ABSTRACT

A cuboid pressure vessel comprises a top wall, a bottom wall, and an external wall. The external wall comprises a main body including a first side wall having a first opening, and a second side wall having a second opening; a first lid secured to the first side wall so as to occlude the first opening; and a second lid secured to the second side wall so as to occlude the second opening. The bottom wall comprises a main body; and a reinforcement rib provided in an upright manner on the outer surface of the main body. The reinforcement rib is provided in an upright manner on the outer surface of an area, within the main body, which contains a central section of the main body, and which excludes four corner sections, a region adjacent to the first lid and a region adjacent to the second lid.

4 Claims, 2 Drawing Sheets

(52) U.S. Cl.
CPC .............. *F17C 2201/0157* (2013.01); *F17C 2201/056* (2013.01); *F17C 2201/058* (2013.01); *F17C 2203/012* (2013.01); *F17C 2203/0617* (2013.01); *F17C 2223/0123* (2013.01); *F17C 2223/036* (2013.01); *F17C 2227/0369* (2013.01)

(58) Field of Classification Search
CPC ........ F17C 2203/012; F17C 2203/0617; F17C 2227/0369; F17C 2223/0123; F17C 2223/036; F16J 12/00
USPC .................................................. 220/592, 581
See application file for complete search history.

(56) References Cited

U.S. PATENT DOCUMENTS

| | | | |
|---|---|---|---|
| 6,595,382 B2* | 7/2003 | Ettlinger | 220/560.11 |
| 8,740,008 B2 | 6/2014 | Kataoka et al. | |
| 8,851,321 B2* | 10/2014 | Ramoo et al. | 220/592 |
| 8,960,485 B2* | 2/2015 | Kataoka et al. | 220/581 |
| 2011/0031257 A1* | 2/2011 | Metz | 220/624 |
| 2013/0048646 A1 | 2/2013 | Kataoka et al. | |
| 2013/0049256 A1 | 2/2013 | Tani et al. | |

FOREIGN PATENT DOCUMENTS

| | | |
|---|---|---|
| JP | 2010-038496 A | 2/2010 |
| JP | 2010-243015 A | 10/2010 |
| JP | 2013-044388 A | 3/2013 |
| JP | 2013-044389 A | 3/2013 |
| WO | 2011/145300 A1 | 11/2011 |

OTHER PUBLICATIONS

International Search Report; PCT/JP2013/003723; Sep. 17, 2013.
Written Opinion of the International Searching Authority; PCT/JP2013/003723; Sep. 17, 2013.

* cited by examiner

PRESSURE VESSEL

TECHNICAL FIELD

The present invention relates to a pressure vessel used as a gas cooler for a compressor or the like.

BACKGROUND ART

Cuboid pressure vessels are conventionally known. In such a cuboid pressure vessel, stress concentration occurs at many sites thereof, compared with a spherical or cylindrical pressure vessel. It is desirable to reduce the occurrence of this stress concentration as much as possible. Therefore, reinforcement ribs are frequently formed in the cuboid pressure vessel. Further, pressure vessels are generally required to be reduced in weight as much as possible while satisfying necessary design requirements therefor.

In relation to this problem, it is disclosed in Patent Document 1 that reinforcement ribs are provided in a cuboid pressure vessel in order to suppress the occurrence of stress concentration thereto, and a weight reduction of the pressure vessel is attained by devising the configuration of the reinforcement ribs. Concretely, a pressure vessel according to Patent Document 1 is provided with a square-shaped top wall, a square-shaped bottom wall, and an external wall which connects the top wall to the bottom wall. The top wall is provided with a square-shaped top-wall main body, and reinforcement ribs provided in an upright manner on the outer surface of the top-wall main body. The external wall has an opening. The opening is occluded by a lid which is configured so that the opening can be occluded. The reinforcement ribs are formed in an area which contains a central section of the top-wall main body and which excludes four corner sections of the top-wall main body. Concretely, the reinforcement ribs include: a square-shaped outer peripheral rib formed so as to linearly interconnect the centers of respective adjacent sides of the top-wall main body; lattice-shaped ribs provided in an upright manner within a central section of an area surrounded by the outer peripheral rib; and connecting ribs formed respectively so as to linearly interconnect the opposed vertexes of the outer peripheral rib.

Such a pressure vessel can be used also as, for example, a gas cooler or a container capable of housing a heat exchanger or the like therein. When this pressure vessel is used as the gas cooler, it is generally used with the surface provided with the reinforcement ribs facing downward. This is based on the reason that the bottom wall side of the pressure vessel needs to be reinforced while the top wall side is sufficiently reinforced. Concretely, piping connections for connecting external piping to the heat exchanger housed in the pressure vessel are generally formed in a plurality of portions of the top wall. The top wall side is sufficiently reinforced with these piping connections. On the other hand, since the piping connections are not provided on the bottom wall side, the reinforcement of the bottom wall side is often needed.

In the pressure vessel of Patent Document 1, the configuration of the reinforcement ribs is devised as described above, whereby a weight reduction from reduced material use is attained while satisfying necessary design requirements for the pressure vessel. However, the pressure vessel of Patent Document 1 cannot be said to be sufficiently reduced in weight.

CITATION LIST

Patent Document

Patent Document 1: JP 2010-243015 A

SUMMARY OF THE INVENTION

An object of the present invention is to provide a pressure vessel which can be further reduced in weight while satisfying necessary design requirements therefor.

To solve the above-mentioned problem, the present inventors paid attention to that, when an internal pressure of high-pressure gas stored in a pressure vessel acts on a wall provided with reinforcement ribs of the pressure vessel, the distribution of stresses produced on the wall becomes uneven. Concretely, a region near the opening of the wall provided with reinforcement ribs is reinforced with a lid which occludes the opening, in addition to with the reinforcement ribs. Therefore, we paid attention to that only a relatively small stress is produced in the region near the opening, or this region has a structure which is excessively reinforced with the reinforcement ribs and the lid. Consequently, we conceived that the weight reduction from reduced material use can be attained by reducing the reinforcement ribs in the region which is excessively reinforced so as to solve the uneven stress distribution caused in the pressure vessel. The present invention is achieved from such a standpoint.

A cuboid pressure vessel according to one aspect of the present invention comprises: a square-shaped top wall; a square-shaped bottom wall which is opposed to the top wall; and an external wall which connects the periphery of the top wall to the periphery of the bottom wall, wherein the external wall is provided with: an external-wall main body which includes a first side wall having a first opening that allows a heat exchanger to be inserted to an area surrounded by the external wall, and a second side wall having a second opening that allows the heat exchanger to be inserted to the area surrounded by the external wall; a first lid which is configured to cover the first opening and which is secured to the first side wall so as to occlude the first opening; and a second lid which is configured to cover the second opening and which is secured to the second side wall so as to occlude the second opening, the bottom wall is provided with: a bottom-wall main body which is connected to the lower end of the external wall; and a bottom-wall reinforcement rib which is provided in an upright manner on the outer surface of the bottom-wall main body, and the bottom-wall reinforcement rib is provided in an upright manner on the outer surface of an area, within the bottom-wall main body, which contains a central section of the bottom-wall main body and which excludes four corner sections, a region adjacent to the first lid and a region adjacent to the second lid of the bottom-wall main body.

DESCRIPTION OF EMBODIMENT

Figure 2:
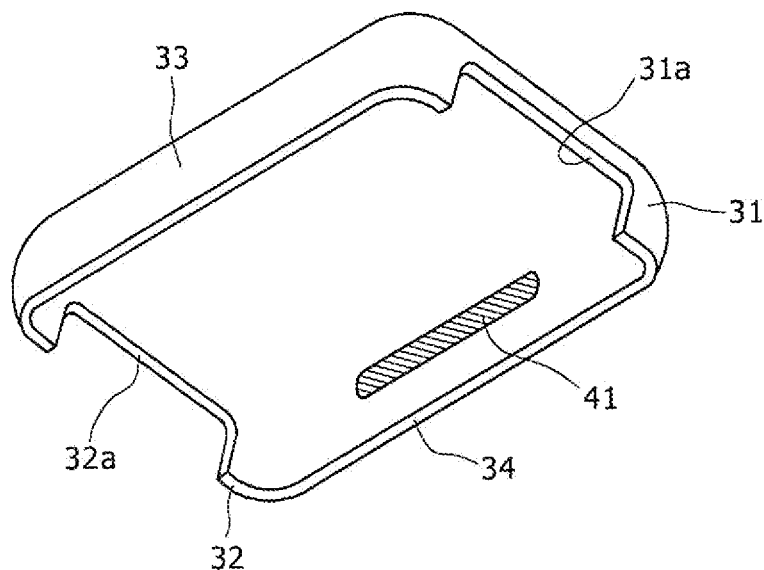
FIG. 2 is a perspective view of the lower half of the pressure vessel of FIG. 1, which is seen from underneath.
Figure 3:
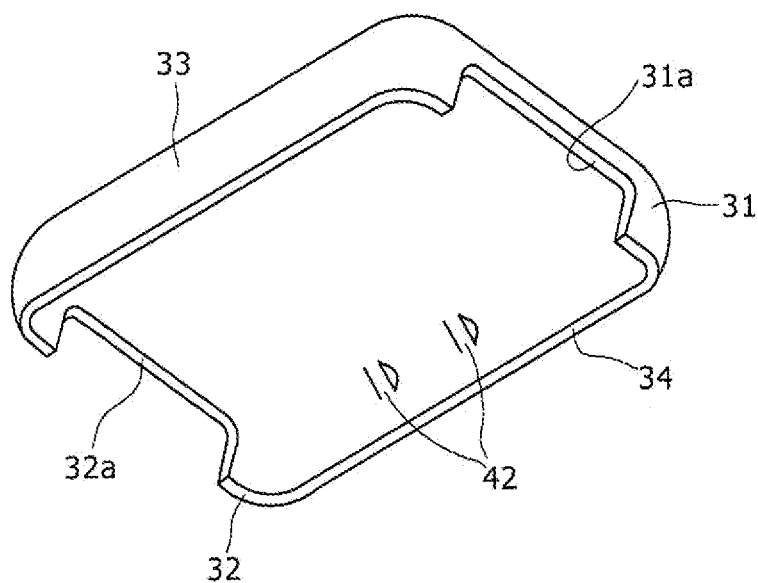
FIG. 3 is a perspective view of the lower half of the pressure vessel of FIG. 1, which is seen from underneath.

A preferred embodiment of the present invention will be then described with reference to FIGS. 1 to 3.

Figure 1:
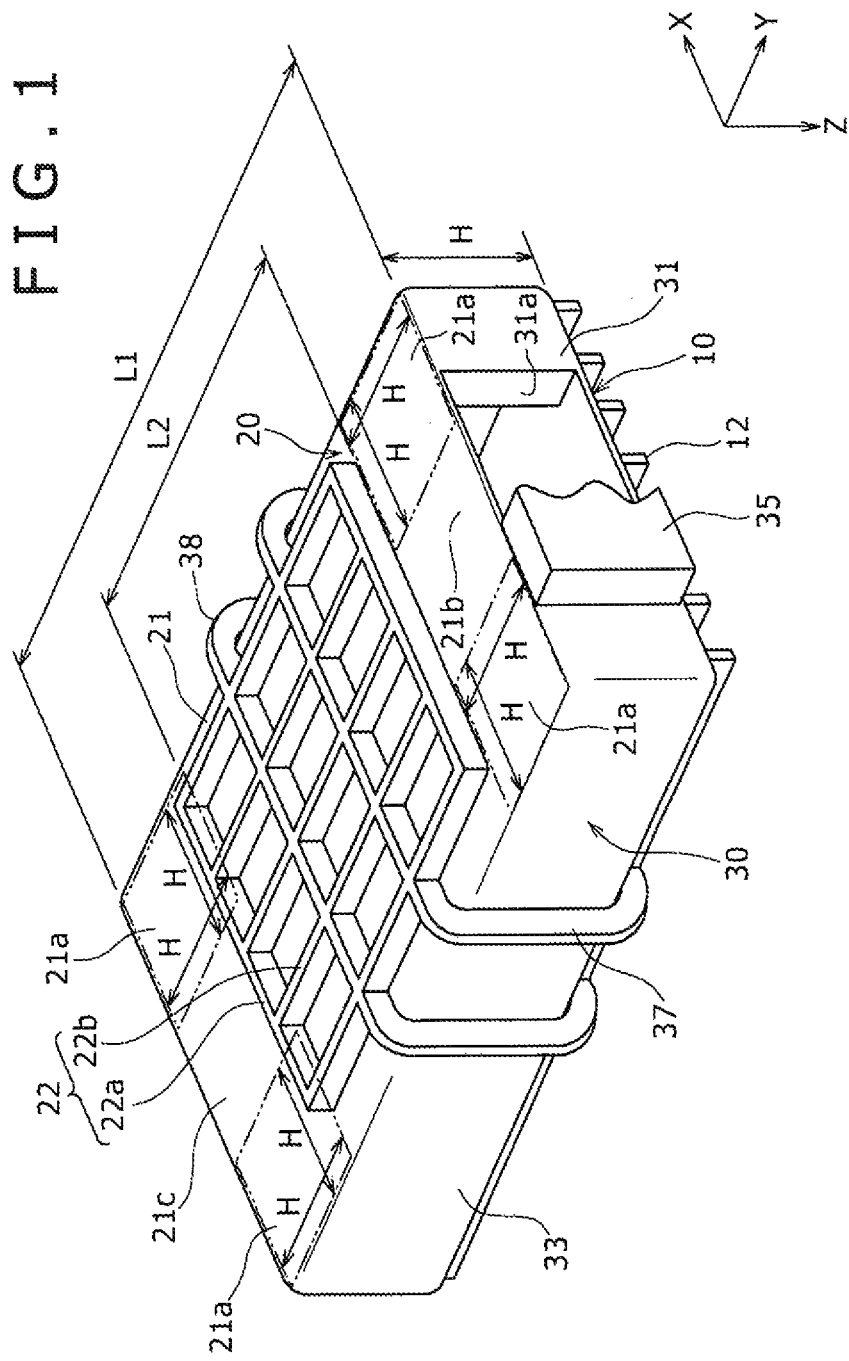
FIG. 1 is a perspective view of a pressure vessel according to one embodiment of the present invention with a bottom wall thereof facing upward.

As shown in FIG. 1, a pressure vessel of this embodiment comprises: a square-shaped top wall 10; a square-shaped bottom wall 20 which is opposed to the top wall 10; and an external wall 30 which connects the periphery of the top wall 10 to the periphery of the bottom wall 20. In this embodiment, each of the top wall 10 and the bottom wall 20 has a rectangular shape long in one direction. In the following description, the short direction (width direction) of the top wall 10 and bottom wall 20 is defined as X-axial direction, the long direction of the top wall 10 and bottom wall 20 is defined as Y-axial direction, and the height direction of the external wall (the alignment direction of the top wall 10 and bottom wall 20) is defined as Z-axial direction. Although a heat exchanger, piping and the like are housed in this pressure vessel, they are not illustrated.

The top wall 10 is provided with: a planar top-wall main body; and a top-wall reinforcement rib 12 for reinforcing the top-wall main body. The top-wall main body is configured to cover up the upper end of the external wall 30. The top-wall main body is connected to the upper end of the external wall 30. The top-wall main body is also provided with a piping connection (not shown) for connecting the piping to the heat exchanger. As shown in FIG. 1, the boundary between the top-wall main body and the external wall 30 is curved in an outwardly projecting manner. The top-wall reinforcement rib 12 is provided in an upright manner on the outer surface of the top-wall main body. In this embodiment, the top-wall reinforcement rib 12 has a lattice shape. The top-wall reinforcement rib 12 has a fixed height throughout the whole body of the top-wall reinforcement rib 12. The top-wall reinforcement rib 12 is composed of ribs extending in a direction parallel to the long direction of the top-wall main body, and ribs extending in a direction parallel to the short direction (width direction) of the top-wall main body. The top-wall reinforcement rib 12 can be omitted.

The bottom wall 20 is provided with: a planar and substantially rectangular-shaped bottom-wall main body 21; and a bottom-wall reinforcement rib 22 provided in an upright manner on the outer surface of the bottom-wall main body 21. The bottom-wall main body 21 is configured to cover up the lower end of the external wall 30. The bottom-wall main body 21 is connected to the lower end of the external wall 30. The bottom-wall main body 21 has four corner sections 21a; a first adjacent section 21b that is a region adjacent to a first lid 35 which will be described later; a second adjacent section 21c that is a region adjacent to a second lid (not shown) which will be described later; and a central section which excepts each corner section 21a and each adjacent section 21b, 21c. As shown in FIG. 1, the boundary between the bottom-wall main body 21 and the external wall 30 is curved in an outwardly projecting manner. The bottom wall 20 has a shape symmetric about a reference face which is orthogonal to the Y-axial direction and which passes through the Y-axial center in the bottom wall 20.

The bottom-wall reinforcement rib 22 is configured to reinforce a region on which a relatively large load acts within the bottom-wall main body 21. Concretely, the bottom-wall reinforcement rib 22 is provided in an upright manner on the outer surface of a central area containing the central section of the bottom-wall main body 21 while it is not provided in an upright manner on the outer surface of the four corner sections 21a, first adjacent section 21b and second adjacent section 21c of the bottom-wall main body 21. In this embodiment, the bottom-wall reinforcement rib 22 is provided with: a plurality of short-directional ribs (width-directional ribs) 22a extending in a direction parallel to the short direction (width direction) of the bottom-wall main body 21; and a plurality of long-directional ribs 22b extending in a direction parallel to the long direction of the bottom-wall main body 21. Each short-directional rib 22a and each long-directional rib 22b are provided in an upright manner respectively on the outer surface of the central area containing the central section of the bottom-wall body 21 with the exception of each corner section 21a, the first adjacent section 21b and the second adjacent section 21c. Namely, ribs 22a provided in an upright manner on the outermost of the plurality of short-directional ribs 22a are located in an upright manner inside the first adjacent section 21b and the second adjacent section 21c, and are never overlapped with each corner section 21a, the first adjacent section 21b and the second adjacent section 21c in the thickness direction (Z-axial direction) of the bottom-wall main body 21. Both long-directional ends of each long-directional rib 22b are located inside each corner section 21a, the first adjacent section 21b and the second adjacent section 21c, and are never overlapped with each corner section 21a, the first adjacent section 21b and the second adjacent section 21c in the thickness direction (Z-axial direction) of the bottom-wall main body 21. In this embodiment, the bottom-wall reinforcement rib 22 is provided with four short-directional ribs 22a and five long-directional rigs 22b. The height dimension (the projection amount from the bottom-wall main body 21 to the negative side in the Z-axial direction) of each short-directional rib 22a is set constant throughout the whole body thereof. The height dimension of each long-directional rib 22b is set constant throughout the whole body thereof. Two short-directional ribs 22a which are centrally located in an upright manner, of the plurality of short-directional ribs 22a, are configured to extend continuously from one short-directional (width-directional) end side of the bottom-wall main body 21 to the other end side thereof. Two short-directional ribs 22a which are located in an upright manner on the outer side, of the plurality of short-directional ribs 22a, are configured to be shorter in length than the central ribs 22a. All of the long-directional ribs 22b have a same length dimension L2. The length dimension L2 of the long-directional ribs 22b is set so as to be equal to a value obtained by subtracting twice the height dimension H of the external wall 30 from the long-directional dimension L1 of the bottom-wall main body 21.

Each of the corner sections 21a of the bottom-wall main body 21 means a square-shaped area having a side which contains each vertex of the bottom-wall main body 21 and has the same dimension as the height dimension H of the external wall 30 as each side. The first adjacent section 21b means a square-shaped area having; a portion which is overlapped with a first opening 31a in the Z-axial direction, within the peripheral edge on a first side wall 31 side (the positive side in the Y-axial direction of FIG. 1) of the bottom-wall main body 21 and has the same length as the X-axial length of a first lid 35 as a first side; and a portion which is extended from an end of the first side in a direction orthogonal to the first side (the negative side in the Y-axial direction) by the same dimension as the height dimension H of the external wall 30 as a second side. The description of the second adjacent section 21c is omitted since the bottom-wall main body 21 has a shape symmetric about the reference face.

The external wall 30 is provided with: an external-wall main body; a first lid 35; a second lid (not shown); third side-wall reinforcement ribs 37; and fourth side-wall reinforcement ribs 38. In FIG. 1, the first lid 35 is partially cut. The external wall 30 has a shape symmetric about the reference face. The external-wall main body has a substantially square cylinder-like shape having a fixed thickness throughout the whole circumference thereof. Concretely, the external-wall main body is provided with: a first side wall 31 located on one long-directional end side of the bottom-wall main body 21 (on the right side of FIG. 1); a second side wall 32 opposed to the first side wall 31; a third side wall 33 orthogonal to the first side wall 31 and the second side wall 32; and a fourth side wall 34 opposed to the third side wall 33.

The first side wall 31 has a rectangular shape long in the short direction of the bottom-wall main body 21 (in the X-axial direction), and has a first opening 31a at the center. The first opening 31a is configured to allow a heat exchanger to be inserted to an area surrounded by the external wall 30. In this embodiment, the area of the first opening 31a is set to be ⅕ or more of the area of the first side wall 31. The first opening 31a is occluded by the first lid 35 which has a shape slightly larger than the first opening 31a, or which is configured to occlude the first opening 31a. The first lid 35 is secured to the first side wall 31 by a bolt or the like from the outer surface side of the first side wall 31.

The description of the second side wall 32 side is omitted since the external wall 30 has the shape symmetric about the reference face. As shown in FIGS. 2 and 3, the second side wall 32 has a second opening 32a having the same shape as the first opening 31a at the center. The second opening 32a is occluded by the second lid (not shown) having the same shape as the first lid 35. In FIGS. 2 and 3, the third side-wall reinforcement ribs 37 and each lid are omitted.

Each of the third side wall 33 and the fourth side wall 34 has a rectangular shape long in a direction orthogonal to the first side wall 31 (Y-axial direction).

The third side-wall reinforcement ribs 37 are provided in an upright manner on the outer surface of the third side wall 33. The third side-wall reinforcement ribs 37 are configured to extend in a direction parallel to the height direction (Z-axial direction) of the third side wall 33 and to connect the upper end of the third side wall 33 to the lower end thereof. The third side-wall reinforcement ribs 37 are provided in an upright manner in a range overlapped with the long-directional ribs 22b in the X-axial direction within the outer surface of the third side wall 33. In this embodiment, the third side-wall reinforcement ribs 37 are provided at positions adjacent to the centrally-located ribs 22b of the plurality of short-directional ribs (width-directional ribs) 22a. The upper ends of the third side-wall reinforcement ribs 37 are connected to the top-wall reinforcement rib 12, and the lower ends of the third side-wall reinforcement ribs 37 are connected to the centrally-located ribs 22a of the plurality of short-directional ribs 22a. The third side-wall reinforcement ribs 37 are set to have the same height throughout the whole body thereof. Since the fourth side wall 34 has the same shape as the third side wall 33, and the fourth side-wall reinforcement ribs 38 have the same shape as the third side-wall reinforcement ribs 37, the descriptions thereof are omitted. The third side-wall reinforcement ribs 37 and the fourth side-wall reinforcement ribs 38 can be omitted.

When high-pressure gas is sealed in this pressure vessel, loads act on the top wall 10, the bottom wall 20 and the external wall 30 respectively to expand these walls outwardly. Since the bottom-wall main body 21 has a planar shape, the central section of the bottom-wall main body 21 is thus apt to be deformed largely, compared with other sections. However, since the central section of the bottom-wall main body 21 is reinforced with the bottom-wall reinforcement rib 22, the deformation thereof is suppressed. Accordingly, the stress produced in the central section of the bottom-wall main body 21 is reduced. Each corner section 21a of the bottom-wall main body 21 contains each vertex of the bottom-wall main body 21 which is sufficiently reinforced with the external wall 30, and thus has sufficient rigidity. Therefore, the stresses produced in these corner sections 21a are relatively minimized. Since the first adjacent portion 21b of the bottom-wall main body 21 is reinforced with the first lid 35, and the second adjacent portion 21c of the bottom-wall main body 21 is reinforced with the second lid, only a relatively small load acts on each adjacent section 21b, 21c. In detail, the first lid 35 is secured to the outer surface of the first side wall 31 so as to cover the first opening 31a although the portion forming the first opening 31a of the first side wall 31 becomes a free end. Therefore, the expansion around the first opening 31a is suppressed by the first lid 35. The deformation amount of the portion forming the first opening 31a and the vicinity thereof is thus relatively minimized. Accordingly, even when the high-pressure gas is stored in this pressure vessel, only a relatively small stress is produced in the first adjacent section 21b. This can be said also about the second wall 32 side.

In this way, in the pressure vessel of this embodiment, only relatively small stresses are produced in each corner section 21a and each adjacent section 21b, 21c. Therefore, it is not necessary to provide the bottom-wall reinforcement rib in these sections, and the pressure vessel can be reduced in weight accordingly. The bottom-wall reinforcement rib 22 is provided in an upright manner on the outer surface of the area which contains the central section of the bottom-wall main body 21 and which excludes four corner sections 21a and each adjacent section 21b, 21c, whereby the distribution of stresses produced in the bottom-wall main body 21 can be prevented from becoming uneven. Additionally, since the external wall 30 of this pressure vessel has the openings at two sites, the heat exchanger can be easily housed in the pressure vessel.

In this embodiment, since the third side-wall reinforcement ribs 37 are provided on the outer surface of the third side wall 33, the third side wall 33 can be reinforced. Further, since the third side-wall reinforcement ribs 37 are configured to connect to the top-wall reinforcement rib 12 and the bottom-wall reinforcement rib 22, or the ribs are extended continuously between the upper and lower ends thereof, the occurrence of stress concentration to the vicinity of the upper and lower ends of the third side-wall reinforcement ribs 37 can be suppressed. This can be said also about the fourth side wall 34 side.

When the high-pressure gas is sealed in this pressure vessel, the boundary between the bottom-wall main body 21 and the third side wall 33 and the boundary between the bottom-wall main body 21 and the fourth side wall 34 are relatively highly stressed. Thus, the pressure vessel preferably further comprises lower reinforcement portions for reinforcing the vicinity of the boundaries. Concretely, as shown in FIGS. 2 and 3, lower reinforcement portions 41, 42 are preferably provided on the inner surface of the pressure vessel. The lower reinforcement portion 41 shown in FIG. 2 is configured to bulge from the boundary between the inner surface of the third side wall 33 and the inner surface of the bottom-wall main body 21 toward the inside and to extend along the boundary. This applies also to the fourth side wall 34 side. The lower reinforcement portion 42 shown in FIG. 3 is configured to be connected to the inner surface of the third side wall 33 and the inner surface of the bottom-wall main body 21 in such a manner that it straddles the boundary between the inner surface of the third side wall 33 and the inner surface of the bottom-wall main body 21. This applies also to the fourth side wall 34 side. According to this, the occurrence of stress concentrations to the boundary between the third side wall 33 and the bottom-wall main body 21 and to the boundary between the fourth side wall 34 and the bottom-wall main body 21 can be effectively suppressed. Further, since each lower reinforcement portion 41, 42 is located on the inner surface side of the external-wall main body and the bottom-wall main body 21, the pressure vessel is never disfigured.

The embodiment disclosed herein should be considered to be an example and not to be limitative. The scope of the present invention is indicated not by the above-mentioned embodiment but by the claims, and all changes within the meaning and scope equal to the claims are embraced by the claims.

For example, although each of the top-wall main body and the bottom-wall main body 21 has a rectangular shape long in the Y-axial direction in the above-mentioned embodiment, it may have a rectangular shape long in the X-axial direction or a square shape.

Although the bottom-wall reinforcement rib 22 in the above-mentioned embodiment has a lattice shape in which each short-directional rib 22a is parallel to the short direction of the bottom-wall main body 21 and each long-directional rib 22b is parallel to the long direction of the bottom-wall main body 21, the shape of the bottom-wall reinforcement rib 22 is not limited thereto. For example, the bottom-wall reinforcement rib 22 may be configured such that first ribs extending in a direction inclined to the long direction of the bottom-wall main body 21 and second ribs extending in a direction orthogonal to the first ribs are arranged in a lattice shape, or such that square-shaped inner ribs similar to a square-shaped outer rib formed by ribs extending in a direction parallel to the long direction of the bottom-wall main body 21 and ribs orthogonal thereto are successively provided in an upright manner on the inside of the square-shaped outer rib.

Although the first side wall 31 and the second side wall 32 are mutually opposed, and the third side wall 33 and the fourth side wall 32 are mutually opposed in the external-wall main body of the above-mentioned embodiment, the external-wall main body may be configured, for example, in such a manner that the first side wall 31 and the third side wall 33 are mutually opposed, and the second side wall 32 and the fourth side wall 34 are mutually opposed.

Moreover, although, in the above-mentioned embodiment, the top wall 10 is provided with the top-wall reinforcement rib 12, and the third side-wall reinforcement ribs 37 and the fourth side-wall reinforcement ribs 38 are configured to connect to the top-wall reinforcement rib 12, the third side-wall reinforcement ribs 37 and the fourth side-wall reinforcement ribs 38 may be configured to connect not to the top-wall reinforcement rib 12 but to the piping connection (not shown) formed in the top wall 10.

The above-mentioned embodiment will be then outlined.

(1) The cuboid pressure vessel of the above-mentioned embodiment comprises: a square-shaped top wall; a square-shaped bottom wall which is opposed to the top wall; and an external wall which connects the periphery of the top wall to the periphery of the bottom wall. The external wall is provided with: an external-wall main body which includes a first side wall having a first opening that allows a heat exchanger to be inserted to an area surrounded by the external wall, and a second side wall having a second opening that allows the heat exchanger to be inserted to the area surrounded by the external wall; a first lid which is configured to cover the first opening and which is secured to the first side wall so as to occlude the first opening; and a second lid which is configured to cover the second opening and which is secured to the second side wall so as to occlude the second opening. The bottom wall is provided with: a bottom-wall main body which is connected to the lower end of the external wall; and a bottom-wall reinforcement rib which is provided in an upright manner on the outer surface of the bottom-wall main body. The bottom wall reinforcement rib is provided in an upright manner on the outer surface of an area, within the bottom-wall main body, which contains a central section of the bottom-wall main body and which excludes four corner sections, a region adjacent to the first lid and a region adjacent to the second lid of the bottom-wall main body.

In this pressure vessel, since the bottom-wall reinforcement rib is provided in an upright manner on the outer surface of the area which contains the central section where a relatively large stress is produced within the bottom-wall main body while it is not provided in portions, within the bottom-wall main body, where only relatively small stresses are produced, or in four corner sections and the region adjacent to each lid, a weight reduction from reduced material use can be attained while satisfying the design requirements necessary for the pressure vessel. Concretely, the central section of the bottom-wall main body is apt to be deformed most largely when the high-pressure gas is stored in the pressure vessel. However, since this central section is reinforced with the bottom-wall reinforcement rib, the deformation thereof is suppressed. Accordingly, the stress produced in the central section is reduced. On the other hand, since the corner sections contain the vertexes of the bottom-wall main body which are sufficiently reinforced by the connection to the external wall, these portions have sufficient rigidity. Therefore, the stresses produced in the corner sections are relatively minimized. Further, since the region adjacent to each lid of the bottom-wall main body is reinforced with each lid, only a relatively small stress is produced in the region adjacent to each lid. In detail, the first lid is secured so as to cover the first opening from the outer surface side of the first side wall although the portion forming the first opening of the first side wall becomes a free end. Therefore, the expansion around the first opening is suppressed by the first lid. The deformation of the portion forming the first opening and the vicinity thereof is thus suppressed. Consequently, even when the high-pressure gas is stored in the pressure vessel, only a relatively small stress is produced in the region adjacent to the first lid of the bottom-wall main body. This can be said also about the second side-wall side.

In this way, only relatively small stresses are produced in each corner section and the region adjacent to each lid in this pressure vessel. Therefore, it is not necessary to provide the bottom-wall reinforcement rib in these portions, and the weight of the pressure vessel can be reduced accordingly. The bottom-wall reinforcement rib is provided in an upright manner on the outer surface of the area which contains the central section of the bottom-wall main body and which excludes four corner sections and the region adjacent to each lid of the bottom-wall main body, whereby the stress distribution caused in the bottom-wall main body can be prevented from becoming uneven. In addition, since the external wall of the pressure vessel has the openings at two sites, the heat exchanger can be easily housed in the pressure vessel.

(2) Each of the corner sections preferably has a square shape having a side containing each vertex of the bottom-wall main body and having the same dimension as the height dimension of the external wall as each side. The region adjacent to the first lid preferably has a square shape having; a portion which has a length corresponding to the first lid, within the peripheral edge on the first side-wall side of the bottom-wall main body, as a first side; and a portion which is extended from an end of the first side in a direction orthogonal to the first side by the same dimension as the height dimension of the external wall as a second side. The region adjacent to the second lid preferably has a square shape having; a portion which has a length corresponding to the second lid, within the peripheral edge on the second side-wall side of the bottom-wall main body, as a first side; and a portion which is extended from an end of the first side in a direction orthogonal to the first side by the same dimension as the height dimension of the external wall as a second side.

According to this, the weight of the pressure vessel can be easily reduced while solving the uneven stress distribution caused in the bottom-wall main body.

(3) The pressure vessel preferably further comprises a first lower reinforcement portion and a second lower reinforcement portion for reinforcing the boundary between the external-wall main body and the bottom-wall main body. It is preferred that the external-wall main body is provided with: a third side wall different from the first side wall and the second side wall; and a fourth side wall different from the first side wall, the second side wall and the third side wall, the first lower reinforcement portion is provided on the inner surface side of the third side wall and the bottom-wall main body within the boundary between the third side wall and the bottom-wall main body, and the second lower reinforcement portion is provided on the inner surface side of the fourth side wall and the bottom-wall main body within the boundary between the fourth side wall and the bottom-wall main body.

According to this, the occurrence of stress concentrations to the boundary between the third side wall and the bottom-wall main body and to the boundary between the fourth side wall and the bottom-wall main body can be effectively suppressed. Further, since each lower reinforcement portion is provided on the inner surface side of each side wall and the bottom-wall main body, the pressure vessel is never disfigured.

(4) The top wall may be provided with a top-wall main body which is connected to the upper end of the external wall, and a top-wall reinforcement rib which is provided in an upright manner on the outer surface of the top-wall main body, and the first side wall and the third side wall may be opposed to the second side wall and the fourth side wall respectively. The external wall is preferably further provided with: third side-wall reinforcement ribs which are provided in an upright manner on the outer surface of the third side wall and which are configured to extend throughout the whole area in the height direction of the third side wall and to connect to the top-wall reinforcement rib and the bottom-wall reinforcement rib; and fourth side-wall reinforcement ribs which are provided in an upright manner on the outer surface of the fourth side wall and which are configured to extend throughout the whole area in the height direction of the fourth side wall and to connect to the top-wall reinforcement rib and the bottom-wall reinforcement rib.

According to this, the third side-wall side and the fourth side-wall side can be effectively reinforced. Concretely, since the third side-wall reinforcement ribs are configured to extend throughout the whole area in the height direction of the third side wall, the third side wall is reinforced. Further, since the third side-wall reinforcement ribs are configured to connect to the top-wall reinforcement rib and the bottom-wall reinforcement rib, or are extended continuously between the upper and lower ends thereof, the occurrence of stress concentrations to the boundary between the third side-wall reinforcement ribs and the top-wall reinforcement rib and to the boundary between the third side-wall reinforcement ribs and the bottom-wall reinforcement rib is suppressed. This can be said also about the fourth side-wall side.

The invention claimed is:

1. A cuboid pressure vessel, comprising:
a square-shaped top wall;
a square-shaped bottom wall which is opposed to the top wall; and
an external wall which connects the periphery of the top wall to the periphery of the bottom wall, wherein
the external wall is provided with: an external-wall main body which includes a first side wall having a first opening that allows a heat exchanger to be inserted to an area surrounded by the external wall, and a second side wall having a second opening that allows the heat exchanger to be inserted to the area surrounded by the external wall; a first lid which is configured to cover the first opening and which is secured to the first side wall so as to occlude the first opening; and a second lid which is configured to cover the second opening and which is secured to the second wall so as to occlude the second opening, where the size of the first opening is such that the first opening does not extend to substantially cover an entire area of the first side wall and the size of the second opening is such that the second opening does not extend to substantially cover an entire area of the second side wall;
the bottom wall is provided with: a bottom-wall main body which is connected to the lower end of the external wall; and a bottom-wall reinforcement rib which is provided in an upright manner on the outer surface of the bottom-wall main body, and
the bottom-wall reinforcement rib is provided in an upright manner on the outer surface of an area, within the bottom-wall main body, which contains a central section of the bottom-wall main body and which excludes four corner sections, a region adjacent to the first lid, and a region adjacent to the second lid of the bottom-wall main body such that the outer surfaces of the four corner sections, the region adjacent to the first lid and the region adjacent to the second lid of the bottom-wall main body have no ribs and are substantially flat.

2. The pressure vessel according to claim 1, wherein each of the corner sections has a square shape having a side containing each vertex of the bottom-wall main body and having the same dimension as the height dimension of the external wall as each side,
the region adjacent to the first lid has a square shape having a portion which has a length corresponding to the first lid, within the peripheral edge on the first side-wall side of the bottom-wall main body, as a first side; and a portion which is extended from an end of the first side in a direction orthogonal to the first side by the same dimension as the height dimension of the external wall as a second side, and
the region adjacent to the second lid has a square shape having a portion which has a length corresponding to the second lid, within the peripheral edge on the second side-wall side of the bottom-wall main body, as a first side; and a portion which is extended from an end of the first side in a direction orthogonal to the first side by the same dimension as the height dimension of the external wall as a second side.

3. The pressure vessel according to claim 1, wherein
the pressure vessel further comprises: a first lower reinforcement portion and a second lower reinforcement portion for reinforcing the boundary between the external-wall main body and the bottom-wall main body;
the external-wall main body is provided with: a third side wall different from the first side wall and the second side wall; and a fourth side wall different from the first side wall, the second side wall and the third side wall,
the first lower reinforcement portion is provided on the inner surface side of the third side wall and the bottom-wall main body within the boundary between the third side wall and the bottom-wall main body, and
the second lower reinforcement portion is provided on the inner surface side of the fourth side wall and the bottom-wall main body within the boundary between the fourth side wall and the bottom-wall main body.

4. The pressure vessel according to claim 3, wherein
the top wall is provided with a top-wall main body which is connected to the upper end of the external wall, and a top-wall reinforcement rib which is provided in an upright manner on the outer surface of the top-wall main body,
the first side wall and the second side wall are opposed to each other, and the third side wall and the fourth side wall are opposed to each other, and
the external wall is further provided with: third side-wall reinforcement ribs which are provided in an upright manner on the outer surface of the third side wall and which are configured to extend throughout the whole area in the height direction of the third side wall and to connect to the top-wall reinforcement rib and the bottom-wall reinforcement rib; and fourth side-wall reinforcement ribs which are provided in an upright manner on the outer surface of the fourth side wall and which are configured to extend throughout the whole area in the height direction of the fourth side wall and to connect to the top-wall reinforcement rib and the bottom-wall reinforcement rib.

* * * * *